United States Patent
Hoshino et al.

(10) Patent No.: US 9,179,117 B2
(45) Date of Patent: Nov. 3, 2015

(54) IMAGE PROCESSING APPARATUS

(71) Applicant: Kabushiki Kaisha Toshiba, Tokyo (JP)

(72) Inventors: Hiromi Hoshino, Kumagaya (JP); Yusuke Ikeda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 13/973,640

(22) Filed: Aug. 22, 2013

(65) Prior Publication Data

US 2014/0003794 A1   Jan. 2, 2014

Related U.S. Application Data

(63) Continuation of application No. PCT/JP2013/058201, filed on Mar. 14, 2013.

(30) Foreign Application Priority Data

Jul. 2, 2012   (JP) .................................. 2012-148650

(51) Int. Cl.
| | |
|---|---|
| *H04N 9/88* | (2006.01) |
| *H04N 5/94* | (2006.01) |
| *H04N 9/80* | (2006.01) |
| *H04N 9/87* | (2006.01) |
| *H04N 5/76* | (2006.01) |
| *H04N 21/41* | (2011.01) |
| *H04N 21/4363* | (2011.01) |
| *H04N 21/442* | (2011.01) |
| *H04N 9/885* | (2006.01) |
| *H04N 5/445* | (2011.01) |
| *H04N 5/765* | (2006.01) |

(52) U.S. Cl.
CPC . *H04N 9/87* (2013.01); *H04N 5/76* (2013.01); *H04N 21/4122* (2013.01); *H04N 21/43635* (2013.01); *H04N 21/44227* (2013.01); *H04N 5/445* (2013.01); *H04N 5/765* (2013.01)

(58) Field of Classification Search
USPC .................. 386/263, 264, 267, 239, 240, 248
See application file for complete search history.

(56) References Cited

U.S. PATENT DOCUMENTS

| | | | |
|---|---|---|---|
| 2003/0090590 A1 | 5/2003 | Yoshizawa et al. | |
| 2008/0155639 A1* | 6/2008 | Miyagi | 725/139 |
| 2008/0195923 A1 | 8/2008 | Masumori | |
| 2012/0309319 A1* | 12/2012 | Nojiri | 455/66.1 |

FOREIGN PATENT DOCUMENTS

| | | |
|---|---|---|
| EP | 2560381 A1 | 2/2013 |
| JP | 2003-259241 | 9/2003 |
| JP | 2008-160653 | 7/2008 |
| JP | 2008-199175 | 8/2008 |
| JP | 2011-172146 | 9/2011 |
| JP | 2011-259050 | 12/2011 |
| JP | 2012-109736 | 6/2012 |

OTHER PUBLICATIONS

International Search Report and Written Opinion from corresponding PCT/JP2013/058201 application mailed Jun. 18, 2013.

* cited by examiner

*Primary Examiner* — Daquan Zhao
(74) *Attorney, Agent, or Firm* — Rutan & Tucker LLP; William W. Schaal

(57) ABSTRACT

According to one embodiment, an image processing apparatus includes, an error detector configured to make an error check of the stream received, a player configured to reproduce the stream, a memory configured to store a plurality of pieces of displaying data indicating formats of the streams that can be processed by the image processing apparatus, a transmitter configured to transmit the pieces of displaying data stored in the memory to the external device in response to a request from the external device, and a rewriting module configured to delete one piece of displaying data stored in the memory when an error is detected by the error detector.

11 Claims, 4 Drawing Sheets

175

| Priority (function) | HDMI representative resolving level format | Transmission frequency |
|---|---|---|
| 1(High) | 4k2k | 297MHz |
| 2 | 1080p DeepColor | 222.75MHz |
| 3 | 1080p | 148.5MHz |
| 4 | 1080i DeepColor | 111.38MHz |
| 5 | 1080i | 74.25MHz |
| 6 | 720p DeepColor | 111.38MHz |
| 7 | 720p | 74.25MHz |
| 8 | 480p DeepColor | 40.5MHz |
| 9 | 480p | 27.0MHz |
| 10 | 480i DeepColor | 40.5MHz |
| 11(Low) | 480i | 27.0MHz |

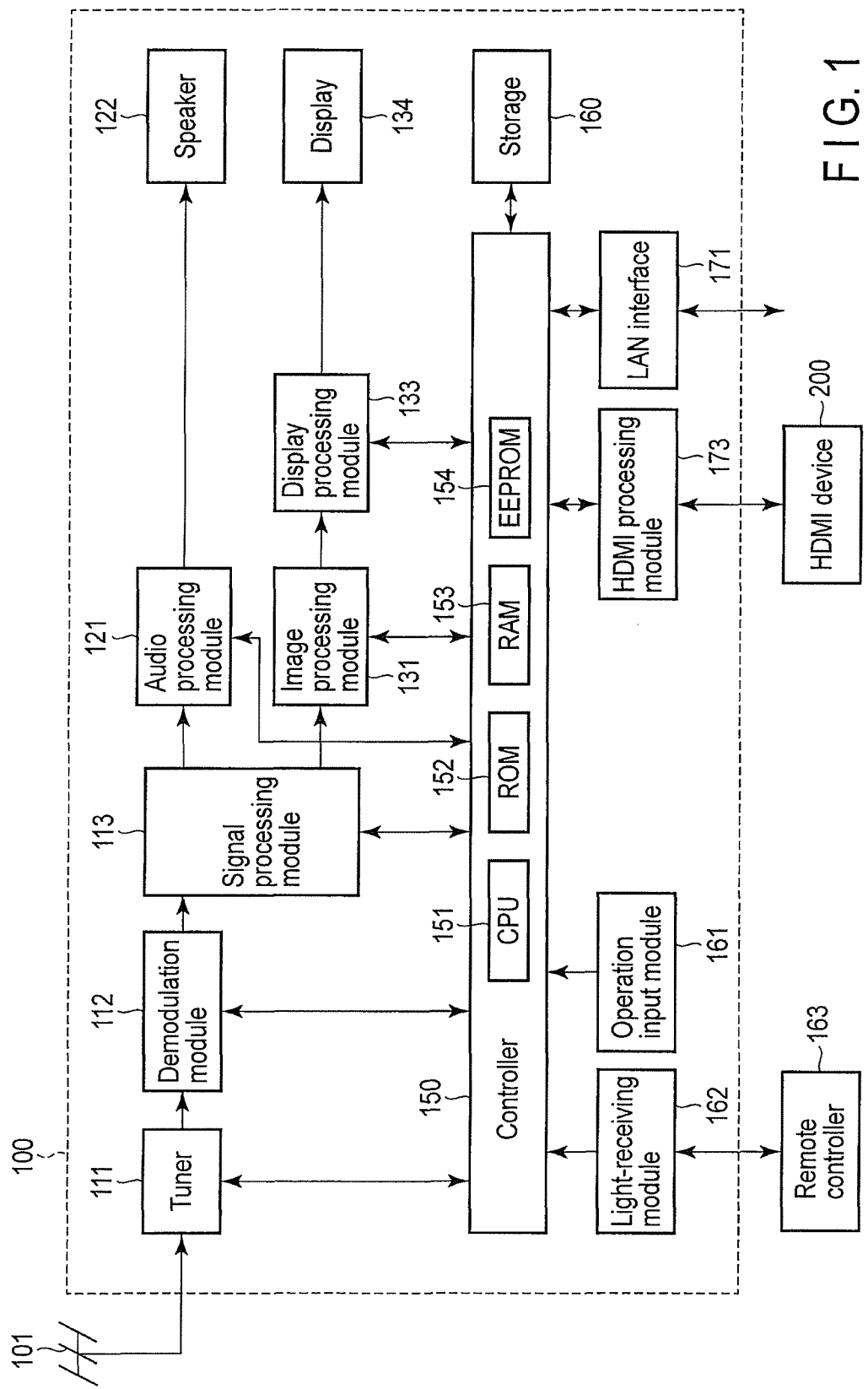
F I G. 1

| Priority (function) | HDMI representative resolving level format | Transmission frequency |
|---|---|---|
| 1(High) | 4k2k | 297MHz |
| 2 | 1080p DeepColor | 222.75MHz |
| 3 | 1080p | 148.5MHz |
| 4 | 1080i DeepColor | 111.38MHz |
| 5 | 1080i | 74.25MHz |
| 6 | 720p DeepColor | 111.38MHz |
| 7 | 720p | 74.25MHz |
| 8 | 480p DeepColor | 40.5MHz |
| 9 | 480p | 27.0MHz |
| 10 | 480i DeepColor | 40.5MHz |
| 11(Low) | 480i | 27.0MHz |

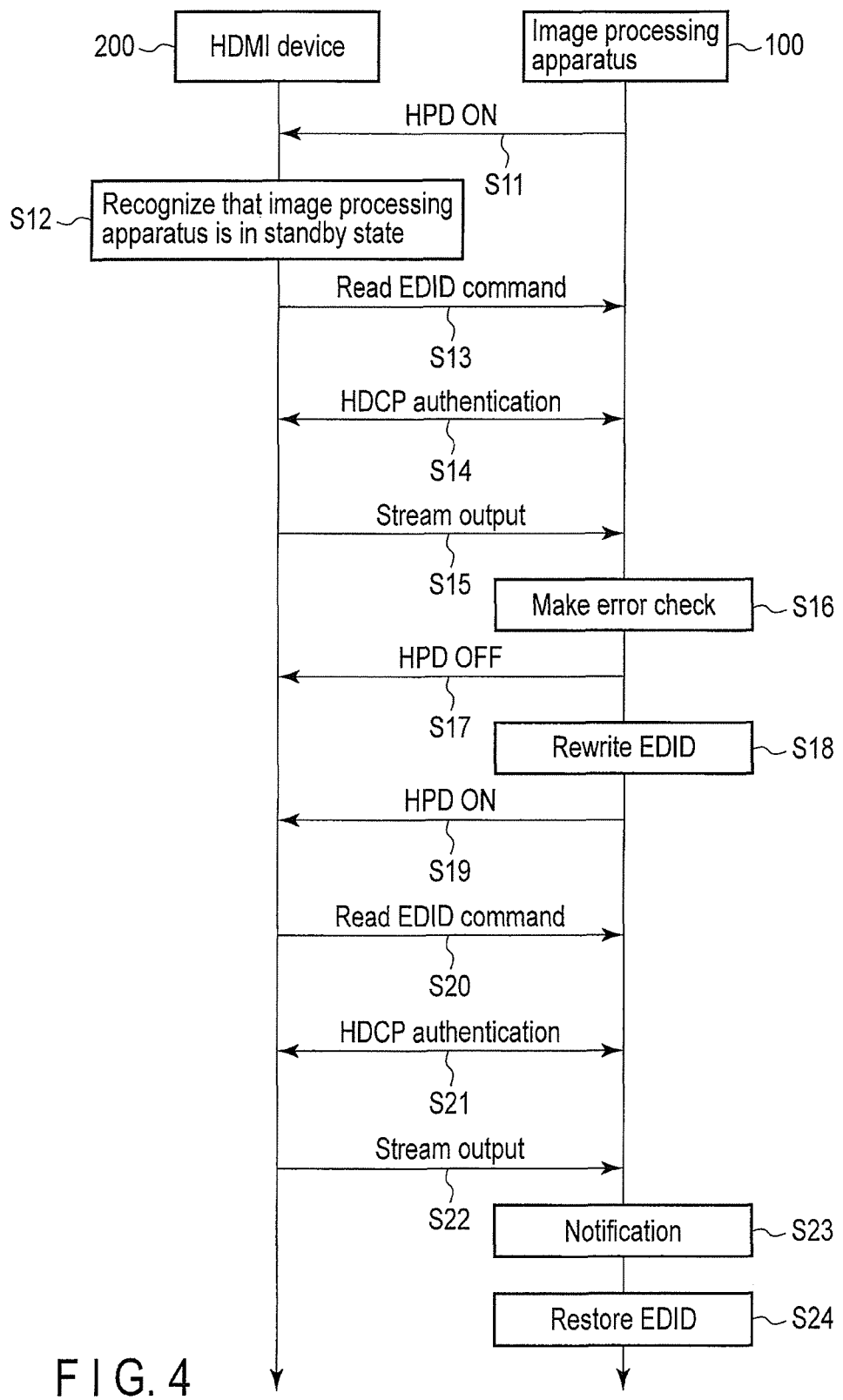
F I G. 4

IMAGE PROCESSING APPARATUS

CROSS REFERENCE TO RELATED APPLICATIONS

This application is a Continuation Application of PCT Application No. PCT/JP2013/058201, filed Mar. 14, 2013 and based upon and claiming the benefit of priority from Japanese Patent Application No. 2012-148650, filed Jul. 2, 2012, the entire contents of all of which are incorporated herein by reference.

FIELD

Embodiments described herein relate generally to an image processing apparatus.

BACKGROUND

Image processing apparatuses capable of recording and reproducing image content (stream) such as movies, television programs, and games have been in widespread use.

Further, image processing apparatuses provided with a terminal (HDMI terminal) conforming to the standard such as HDMI (High Definition Multimedia Interface) (registered trademark) are in widespread use. An HDMI compliant device can send out a stream to another HDMI compliant device via an HDMI cable.

Normally, an image processing apparatus has determined reproducible resolving levels, reproducible color depths, and receivable frequencies in accordance with device specs and the type of receivable streams will not change. Thus, if a received stream cannot be reproduced due to a failure on a communication path, the failure cannot be automatically avoided, posing a problem that user's convenience may be sacrificed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an image processing apparatus according to an embodiment.

FIG. 4 is an exemplary view showing the image processing apparatus according to the embodiment.

DETAILED DESCRIPTION

Figures 2, 3:
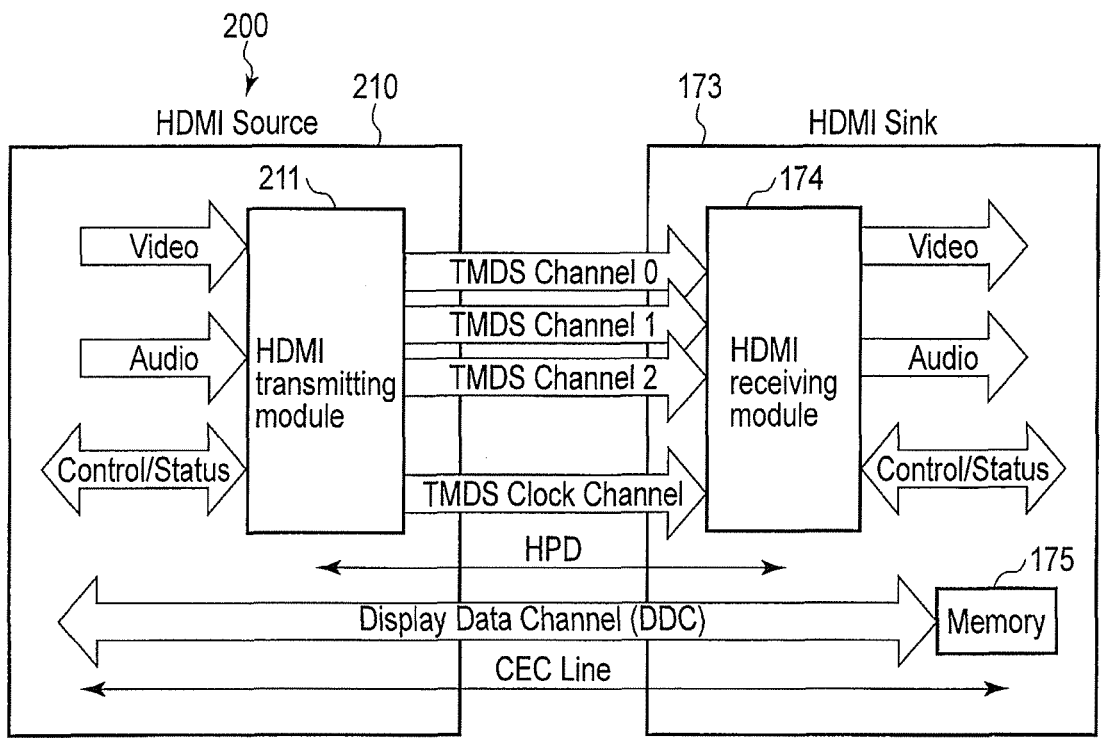
FIG. 2 is an exemplary view showing the image processing apparatus according to the embodiment.
FIG. 3 is an exemplary view showing the image processing apparatus according to the embodiment.

Various embodiments will be described hereinafter with reference to the accompanying drawings. In general, according to one embodiment, an image processing apparatus that reproduces a stream transmitted from an external device, comprises, a connector configured to form a communication path with the external device, an error detector configured to make an error check of the stream received by the connector, a player configured to reproduce the stream, a memory configured to store a plurality of pieces of displaying data indicating formats of the streams that can be processed by the image processing apparatus, a transmitter configured to transmit the pieces of displaying data stored in the memory to the external device in response to a request from the external device, and a rewriting module configured to delete one piece of displaying data stored in the memory when an error is detected by the error detector.

An image processing apparatus according to an embodiment will be described in detail below with reference to the drawings.

FIG. 1 shows an example of an image processing apparatus 100 according to an embodiment.

The image processing apparatus 100 is, for example, a broadcast receiving apparatus capable of reproducing a broadcasting signal or image content stored in a storage medium or an electronic device such as a recorder.

The image processing apparatus 100 includes a tuner 111, a demodulation module 112, a signal processing module 113, an audio processing module 121, an image processing module 131, a display processing module 133, a controller 150, a storage 160, an operation input module 161, a light-receiving module 162, a LAN interface 171, and an HDMI processing module 173. The image processing apparatus 100 further includes a speaker 122 and a display 134.

The tuner 111 can receive a digital broadcasting signal received by, for example, an antenna 101. The antenna 101 can receive, for example, a terrestrial digital broadcasting signal, BS (broadcasting satellite) digital broadcasting signal, and/or 110-degree CS (communication satellite) digital broadcasting signal. The tuner 111 can receive data (stream) of content such as a program supplied by the digital broadcasting signal.

The tuner 111 is a tuner for digital broadcasting signals. The tuner 111 does tuning of the received digital broadcasting signal. The tuner 111 transmits the tuned digital broadcasting signal to the demodulation module 112. The image processing apparatus 100 includes a plurality of the tuners 111. The image processing apparatus 100 can tune in to a plurality of broadcasting signals by the plurality of tuners at the same time.

The demodulation module 112 demodulates the received digital broadcasting signal. Accordingly, the demodulation module 112 acquires content data such as a transport stream (TS) from the digital broadcasting signal. The demodulation module 112 inputs the acquired content data into the signal processing module 113. The image processing apparatus 100 includes a plurality of the demodulation modules 112. The plurality of the demodulation modules 112 can demodulate the plurality of respective signals tuned in to by the plurality of the tuners 111.

The antenna 101, the tuner 111, and the demodulation module 112 function, as described above, as a receiving module for receiving content data.

The signal processing module 113 performs signal processing such as separation of content data. That is, the signal processing module 113 separates content data into a digital image signal, digital audio signal, and other data signals. The signal processing module 113 can separate a plurality of TS demodulated by the plurality of the demodulation modules 112. The signal processing module 113 supplies an audio signal to the audio processing module 121. Further, the signal processing module 113 supplies an image signal to the image processing module 131. Further, the signal processing module 113 supplies a data signal to the controller 150.

The signal processing module 113 can also convert the content data into data in a recordable state (recording stream) based on the control of the controller 150. The signal processing module 113 can supply the recording stream to the storage 160 or other modules based on the control of the controller 150.

Further, the signal processing module 113 can transcode the bit rate of content data from the original bit rate into another bit rate. That is, the signal processing module 113 can transcode a stream of the original bit rate acquired based on a broadcasting signal into a stream of a lower bit rate. Accordingly, the signal processing module 113 can be caused to make a recording of content in a state of less capacity.

The audio processing module 121 converts a digital audio signal received from the signal processing module 113 into a signal (audio signal) in a format that can be reproduced by the speaker 122. For example, the audio processing module 121 converts a digital audio signal into an audio signal by digital/analog conversion. The audio processing module 121 supplies an audio signal to the speaker 122. The speaker 122 reproduces a sound based on the supplied audio signal.

The image processing module 131 converts a digital image signal received from the signal processing module 113 into an image signal in a format that can be reproduced by the display 134. That is, the image processing module 131 decodes (reproduces) a digital image signal received from the signal processing module 113 into an image signal in a format that can be reproduced by the display 134. The image processing module 131 outputs an image signal to the display processing module 133.

The display processing module 133 performs image quality adjustment processing of the tint, brightness, sharpness, and contrast and other image quality adjustment processing on a received image signal based on, for example, the control from the controller 150. The display processing module 133 supplies an image signal whose image quality has been adjusted to the display 134. The display 134 displays an image based on the supplied image signal.

The display 134 includes, for example, a liquid crystal display panel including a plurality of pixels arranged in a matrix shape and a liquid crystal display apparatus including a backlight illuminating the liquid crystal panel. The display 134 displays an image based on the image signal supplied from the display processing module 133.

Instead of the display 134, the image processing apparatus 100 may be configured to include an output terminal that outputs an image signal. Also instead of the speaker 122, the image processing apparatus 100 may be configured to include an output terminal that outputs an audio signal. In addition, the image processing apparatus 100 may be configured to include an output terminal that outputs a digital image signal and digital audio signal.

The controller 150 functions as a controller for controlling the operation of each module of the image processing apparatus 100. The controller 150 includes a CPU 151, a ROM 152, a RAM 153, and an EEPROM (nonvolatile memory) 154. The controller 150 performs various kinds of processing based on an operation signal supplied from the operation input module 161.

The CPU 151 includes arithmetic elements to perform various kinds of arithmetic processing. The CPU 151 realizes various functions by executing programs stored in the ROM 152 or the EEPROM 154.

The ROM 152 stores programs to control the image processing apparatus 100 and programs to realize various functions. The CPU 151 activates programs stored in the ROM 152 based on an operation signal supplied from the operation input module 161. The controller 150 thereby controls the operation of each module.

The RAM 153 functions as a work memory of the CPU 151. That is, the RAM 153 stores data read by the CPU 151 as a result of operation by the CPU 151.

The EEPROM 154 is a nonvolatile memory that stores various kinds of setting data and programs.

The storage 160 has a storage medium that stores content. For example, the storage 160 is configured by a hard disk drive (HDD), solid state drive (SSD), or semiconductor memory. The storage 160 can store a recording stream supplied from the signal processing module 113.

The operation input module 161 includes, for example, an operation key or touch pad that generates an operation signal in accordance with operation input by the user. The operation input module 161 may also be configured to receive an operation signal from a keyboard, a mouse, or another input apparatus capable of generating an operation signal. The operation input module 161 supplies an operation signal to the controller 150.

Incidentally, the touch pad includes a device that generates position data based on a capacitance type sensor, thermosensor, or other systems. If the image processing apparatus 100 includes the display 134, the operation input module 161 may be configured to include a touch panel formed integrally with the display 134.

The light-receiving module 162 includes, for example, a sensor to receive an operation signal from a remote controller 163. The light-receiving module 162 supplies a received signal to the controller 150. The controller 150 receives a signal supplied from the light-receiving module 162 and amplifies and A/D-converts the received signal to decode into the original operation signal transmitted from the remote controller 163.

The remote controller 163 generates an operation signal based on operation input by the user. The remote controller 163 transmits the generated operation signal to the light-receiving module 162 through infrared-ray communication. The light-receiving module 162 and the remote controller 163 may also be configured to transmit and receive an operation signal through other radio communication such as radio frequency communication.

The LAN interface 171 is an interface to communicate with other devices in a network such as the Internet, an intranet, or a home network via a LAN. For example, the image processing apparatus 100 can acquire and reproduce content recorded in a device in a network through the LAN interface 171. The image processing apparatus 100 can output content data to a device connected through the LAN interface 171.

The LAN interface 171 may be an interface that communicates with a radio communication terminal as an access point via a wireless LAN. The LAN interface 171 can communicate with other devices in a network such as the Internet, an intranet, or a home network via a radio communication terminal.

The HDMI processing module 173 is an interface including an HDMI terminal to perform communication based on the standard such as HDMI (High Definition Multimedia Interface) (registered trademark). A device (HDMI device) 200 conforming to the HDMI standard with a Blu-ray (registered trademark) recorder, DVD recorder, hard disk recorder, or other devices is connected to the HDMI terminal of the HDMI processing module 173. The HDMI processing module 173 can receive a stream output from the connected HDMI device 200.

The controller 150 causes the HDMI processing module 173 to input received content data into the signal processing module 113. The signal processing module 113 separates a digital image signal and digital audio signal from the received content data. The signal processing module 113 transmits the separated digital image signal to the image processing module 131 and the separated digital audio signal to the audio processing module 121.

The image processing apparatus 100 includes a power supplier (not shown). The power supplier receives power from a commercial power supply or the like via an AC adapter or the like. The power supplier converts the received AC power into AD power, which is supplied to each module inside the image processing apparatus 100.

FIG. 2 shows an example of HDMI connection. The HDMI processing module 173 of the image processing apparatus 100 includes, as described above, an HDMI terminal conforming to the HDMI standard. An HDMI processing module 210 of the HDMI device 200 includes an HDMI terminal conforming to the HDMI standard. The HDMI terminal is a connection terminal to form a communication path with an external device (HDMI device 200).

Here, an example in which the HDMI device 200 operates as a source (HDMI source) and the image processing apparatus 100 operates as a sink (HDMI sink) will be described. The HDMI device 200 transmits a stream to the image processing apparatus 100 via an HDMI terminal and HDMI cable. The image processing apparatus 100 receives a stream transmitted from the HDMI device 200 via the HDMI terminal and HDMI cable and performs signal processing on the received stream to reproduce the stream.

In this case, the HDMI processing module 210 of the HDMI device 200 includes an HDMI output module 211. The HDMI output module 211 generates a stream to be transmitted and adds data for error check. The HDMI processing module 173 of the image processing apparatus 100 includes an HDMI receiving module 174. The HDMI receiving module 174 analyzes a received stream.

The HDMI terminals of the HDMI processing module 210 and the HDMI processing module 173 each include a plurality of channels. For example, each HDMI terminal includes a plurality of channels (TMDS channel0, TMDS channel1, TMDS channel2) to transmit data (real data) in the Transitional Minimized Differential Signaling (TMDS) format. The HDMI terminal also includes a channel (TMDS Clock channel) to transmit a clock for synchronization.

The HDMI processing module 210 on the source side generates a stream of content data to be transmitted to the sink side based on signals of image, audio, and various kinds of control/status. The HDMI processing module 210 sends out the generated stream to the sink side via the HDMI terminal and cable.

When a stream is received, the HDMI processing module 173 on the sink side acquires signals of image, audio, and various kinds of control/status by performing signal processing on the received stream. The HDMI processing module 173 supplies acquired signals to the signal processing module 113 based on the control of the controller 150. Accordingly, the image processing apparatus 100 can reproduce the stream acquired from the external HDMI device 200 via the HDMI processing module 173.

Further, the HDMI terminal includes channels (DDC: display data channel and CEC: consumer electronics control) to transmit and receive various control signals between devices.

Further, the HDMI terminal includes a channel (HPD: hot plug detector) to notify the HDMI device 200 on the source side of the status (whether in the standby state or not) of the image processing apparatus 100 on the sink side. The image processing apparatus 100 can notify the HDMI device 200 of whether being in a standby state in which a stream can be processed by controlling the voltage value of HPD.

The HDMI processing module 173 includes a memory (EDID ROM) 175 to store a list of displaying data preset in accordance with specs of the signal processing module 113, the audio processing module 121, the image processing module 131, and the display. That is, the memory 175 stores a plurality of pieces of displaying data showing formats of streams that can be processed by the image processing apparatus 100.

FIG. 3 shows an example of displaying data stored in the memory 175.

The memory 175 stores a plurality of pieces of displaying data showing formats of streams that can be processed by the image processing apparatus 100. Each piece of displaying data includes an HDMI representative resolving level format containing resolving level data showing resolving levels that can be reproduced by the image processing apparatus 100 and color depth data showing color depths that can be reproduced by the image processing apparatus 100 and frequency data showing transmission frequencies that can be received by the image processing apparatus 100.

Further, the memory 175 stores a plurality of pieces of displaying data by ranking (prioritizing) the data. Generally, a higher resolving level, a higher color depth, and a higher transmission speed are desired. Thus, the memory 175 ranks displaying data, for example, in descending order of processing load.

According to the example shown in FIG. 3, displaying data with the largest processing load whose resolving level data is "4k2k", whose color depth data is "Nomal", and whose frequency data is "297 MHz" is set to the top position (first level).

Further, displaying data whose resolving level data is "1080p", whose color depth data is "DeepColor", and whose frequency data is "222.75 MHz" is set to the next position (second level).

In addition, displaying data whose level is the third level to the tenth level in descending order of processing load is set and displaying data with the smallest processing load whose resolving level data is "480i", whose color depth data is "Nomal", and whose frequency data is "27.0 MHz" is set to the lowest position.

When requested from the HDMI device 200 on the source side, the HDMI processing module 173 transmits a list (EDID) of displaying data stored in the memory 175 to the HDMI device 200 via DDC or CEC.

Based on received EDID, the HDMI device 200 recognizes resolving levels, color depths, and transmission frequencies that can be processed by the image processing apparatus 100. Incidentally, a format with an increasing processing load becomes more advantageous in terms of image quality. Thus, the HDMI device 200 sends out a stream in the most advantageous format in terms of image quality from among resolving levels, color depths, and transmission frequencies that can be processed by the image processing apparatus 100 to the image processing apparatus 100. That is, the HDMI device 200 sends out a stream in the format corresponding to the displaying data in the top position stored in the memory 175 to the image processing apparatus 100.

FIG. 4 shows an example of processing by the image processing apparatus 100 and the HDMI device 200.

If the power is ON and a stream is in a reproducible state, the HDMI processing module 173 of the image processing apparatus 100 turns on HPD (for example, the voltage is increased to +5 V) (step S11). The HDMI device 200 on the source side always detects the voltage value of HPD. When the voltage value of HPD is increased, the HDMI device 200 recognizes that the image processing apparatus 100 on the sink side is in a standby state (step S12).

If the image processing apparatus 100 is in a standby state, the HDMI device 200 transmits a command (Read EDID) requesting EDID to the image processing apparatus 100 (step S13).

When the Read EDID command is received, the HDMI processing module 173 of the image processing apparatus 100 reads EDID, which is a list of displaying data, from the memory 175. Further, the HDMI processing module 173 performs authentication based on High-bandwidth Digital Content Protection System (HDCP) with the HDMI device 200 (step S14).

HDCP is a mode to encrypt a signal transmitted between devices. The image processing apparatus 100 and the HDMI device 200 perform mutual authentication by transmitting and receiving a key or the like according to a procedure based on HDCP. If mutually authenticated, the image processing apparatus 100 and the HDMI device 200 can mutually exchange encrypted signals. The HDMI processing module 173 transmits EDID read from the memory 175 to the HDMI device 200, for example, in the course of authentication processing based on HDCP.

The HDMI processing module 173 may also be configured to transmit EDID to the HDMI device 200 in other timing than in the course of authentication processing based on HDCP. For example, the HDMI processing module 173 may be configured to transmit EDID to the HDMI device 200 before authentication processing based on HDCP instead of in the course of authentication processing based on HDCP when the Read EDID command is received. Further, the HDMI processing module 173 may be configured to transmit EDID to the HDMI device 200 after authentication processing based on HDCP.

The HDMI device 200 analyzes EDID transmitted from the image processing apparatus 100 to recognize displaying data indicating the formats such as resolving levels, color depths, and transmission frequencies that can be processed by the image processing apparatus 100. The HDMI device 200 selects the most advantageous displaying data in terms of image quality from the recognized displaying data. The HDMI device 200 transmits a stream (image and audio) corresponding to the format indicated by the selected displaying data to the image processing apparatus 100 (step S15). The HDMI processing module 210 of the HDMI device 200 adds data for error check (for example, a parity bit, CRC code and so on) to the stream to be transmitted to the image processing apparatus 100.

When a stream is received, the HDMI processing module 173 of the image processing apparatus 100 makes an error check, for example, the parity check or CRC (step S16). Incidentally, the controller 150 may be configured to make an error check of a stream received from the HDMI processing module 173. If no error is detected, the HDMI processing module 173 sequentially acquires image and audio from the stream and supplies the image and audio to the signal processing module 113. Accordingly, the image processing apparatus 100 can reproduce the stream acquired from the HDMI device 200.

If an error is detected in the error check, the HDMI processing module 173 turns off HPD (for example, the voltage is decreased to +0 V or −5 V) (step S17). When the voltage value of HPD is increased, the HDMI device 200 on the source side recognizes that the image processing apparatus 100 on the sink side is in a dormant state in which a stream cannot be reproduced. In this case, authentication based o HDCP between the image processing apparatus 100 and the HDMI device 200 is canceled.

Further, the HDMI processing module 173 of the image processing apparatus 100 rewrites EDID stored in the memory 175 (step S18). That is, if an error is detected, the HDMI processing module 173 deletes one piece of a plurality of pieces of displaying data contained in EDID stored in the memory 175.

For example, the HDMI processing module 173 deletes displaying data of the highest priority in EDID. That is, the HDMI processing module 173 deletes displaying data corresponding to the format in which an error has occurred from a list of displaying data of which the HDMI device 200 is notified.

If EDID as shown in FIG. 3 is stored in the memory 175 and an error is detected during processing of a stream in the format corresponding to the displaying data in the top position, the HDMI processing module 173 detects the displaying data (that is, the displaying data whose resolving level data is "4k2k", whose color depth data is "Nomal", and whose frequency data is "297 MHz") in the top position from EDID. As a result, the displaying data whose resolving level data is "1080p", whose color depth data is "DeepColor", and whose frequency data is "222.75 MHz" is in the top position.

After EDID being rewritten, the HDMI processing module 173 turns on HPD again (step S19). In this case, the HDMI device 200 transmits the Read EDID command to the image processing apparatus 100 again (step S20). Accordingly, authentication processing based HDCP is performed between the HDMI device 200 and the image processing apparatus 100 (step S21). At this point, the HDMI processing module 173 reads EDID from the memory 175 and transmits the read EDID to the HDMI device 200.

That is, if an error is detected, the HDMI processing module 173 decreases the voltage value of HPD to close the communication path. Further, the HDMI processing module 173 deletes the displaying data in the top position from a plurality of pieces of displaying data stored in the memory 175. After the deletion of the displaying data is completed, the HDMI processing module 173 increases the voltage value of HPD of the HDMI terminal to establish the communication path again. Further, the HDMI processing module 173 transmits the plurality of pieces of displaying data stored in the memory 175 to the HDMI device 200.

The HDMI device 200 analyzes EDID transmitted from the image processing apparatus 100 to recognize displaying data indicating the formats such as resolving levels, color depths, and transmission frequencies that can be processed by the image processing apparatus 100. The HDMI device 200 selects the most advantageous displaying data in terms of image quality from the recognized displaying data. Because the displaying data in EDID is lowered by one level, the HDMI device 200 selects the displaying data of the format that is inferior to the EDID notified in step S14 in image quality by one level.

The HDMI device 200 transmits a stream (image and audio) corresponding to the format indicated by the selected displaying data to the image processing apparatus 100 (step S22).

When a stream is received, the HDMI processing module 173 of the image processing apparatus 100 makes an error check of the received stream. If no error is detected, the HDMI processing module 173 sequentially acquires image and audio from the stream and supplies the image and audio to the signal processing module 113. Accordingly, the image processing apparatus 100 can reproduce the stream acquired from the HDMI device 200.

Further, if the displaying data in EDID is lowered, that is, the displaying data in EDID is deleted, as described above, the HDMI processing module 173 causes the superposition of a notification on an image reproduced by the image processing module 131 (step S23).

Figure 5:
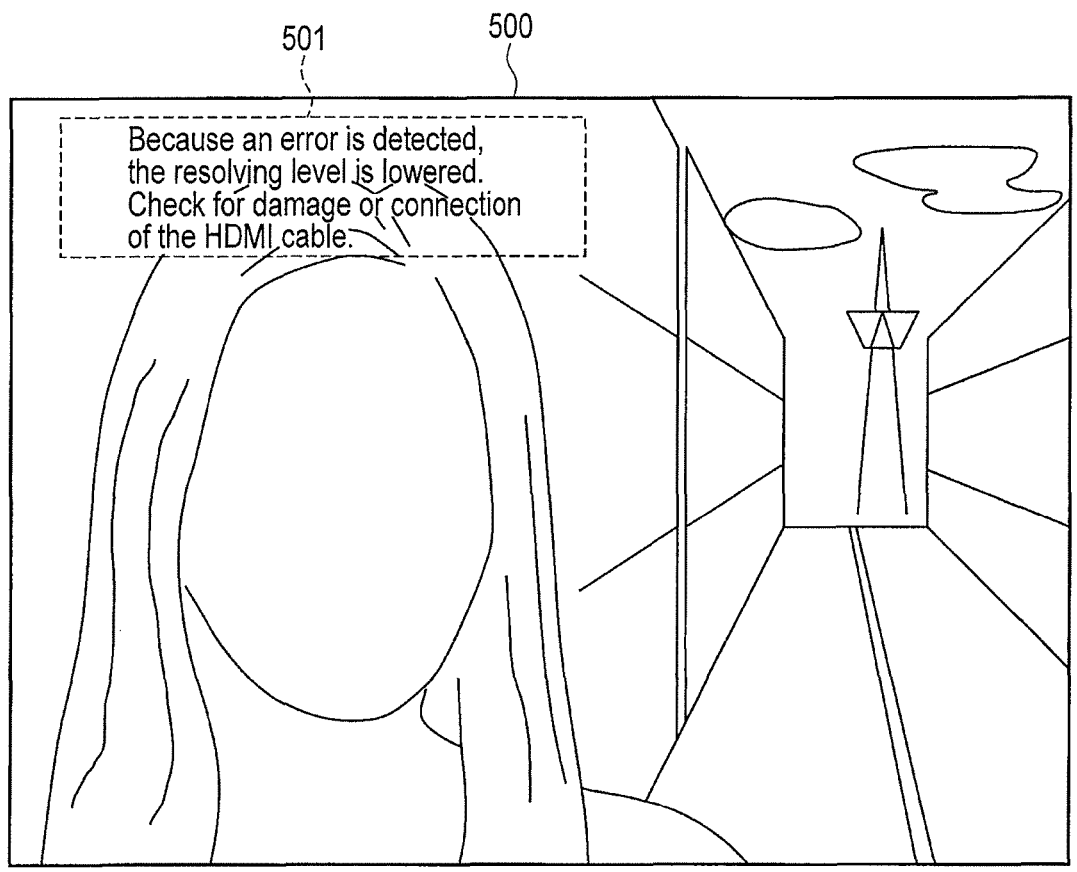
FIG. 5 is an exemplary view showing the image processing apparatus according to the embodiment.

FIG. 5 shows a display example of the notification. The HDMI processing module 173 adds a message 501 indicating that the stream format has been lowered to an image (display screen) 500 reproduced by the image processing module 131.

As causes of an error, poor contact between an HDMI terminal and an HDMI cable, degradation of the HDMI cable, and noise caused by wear and tear can be considered. Thus, the HDMI processing module 173 may add a display prompting the user to check up on connection to the message 501.

For example, the HDMI processing module 173 adds the message 501 "Because an error is detected, the resolving level is lowered. Check for damage or connection of the HDMI cable" to the display screen 500. Accordingly, the image processing apparatus 100 can notify the user that the stream from the source is a stream inferior to the original stream in image quality. Further, the HDMI processing module 173 can prompt the user to check the connection/status of the HDMI cable.

Furthermore, when the reproduction of a stream is completed, the HDMI processing module 173 restores EDID to its original state (step S24). That is, the HDMI processing module 173 detects that a stream is no longer transmitted from the HDMI device 200, the HDMI processing module 173 restores a plurality of pieces of displaying data in EDID in the memory 175 to the state before processing (for example, a state before step S17). Accordingly, the HDMI device 200 can restore the image processing apparatus 100 to its original state after reproduction processing of the stream is completed.

If an error occurs when a stream output from an external device (HDMI device 200) is transmitted, the image processing apparatus 100 rewrites EDID having a plurality of pieces of displaying data showing the formats of a stream that can be processed before reactivation. After the reactivation, the image processing apparatus 100 transmits the rewritten EDID to the HDMI device 200. Accordingly, the image processing apparatus 100 can receive streams in formats with less processing load from the HDMI device 200.

Accordingly, the image processing apparatus 100 can cause automatic switching of a stream output from the HDMI device 200 to a stream in a format that can be reproduced by the image processing apparatus 100. As a result, an image processing apparatus that is more convenient can be provided.

Incidentally, the HDMI processing module 173 of the image processing apparatus 100 may include a plurality of HDMI terminals. In this case, the HDMI processing module 173 may be configured to limit changes of EDID in a period after authentication based on HDCP is performed and before HPD is lowered. Accordingly, for example, even if a plurality of HDMI devices is connected to the image processing apparatus 100, the HDMI processing module 173 can prevent EDID from being changed by processing of HDMI devices other than the HDMI device to be processed.

If the HDMI processing module 173 includes a plurality of HDMI terminals, the HDMI processing module 173 may include a memory to store EDID for each HDMI terminal.

In the above embodiment, the memory 175 is described to be configured to store displaying data in which resolving level data, color depth data, and the transmission frequency as a set by ranking the displaying data, but the configuration is not limited to the above example. The memory 175 may be configured to store by ranking one of the resolving level data, color depth data, and transmission frequency as displaying data.

That is, the memory 175 may be configured to store resolving level data indicating the resolving level in descending order of resolving level as displaying data. The memory 175 may also be configured to store color depth data indicating the color depth in descending order of color depth as displaying data. Further, the memory 175 may also be configured to store the transmission frequency during transmission of the stream in descending order of transmission speed as displaying data.

Functions described in the above embodiment may be constituted not only with use of hardware but also with use of software, for example, by making a computer read a program which describes the functions. Alternatively, the functions each may be constituted by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus configured to process a stream transmitted from an external device, comprising:
   a connector configured to form a communication path with the external device;
   an error detector configured to detect an error in the stream received by the connector;
   a memory configured to store pieces of displaying data indicating formats of streams that can be received by the connector and can be processed by the image processing apparatus;
   a transmitter configured to transmit the pieces of displaying data stored in the memory to the external device in response to a request from the external device; and
   a rewriting module configured to delete one piece of the displaying data stored in the memory when the error is detected by the error detector, wherein the pieces of displaying data are configured to be ranked and the memory is configured to store the ranked displaying data pieces, and
   the rewriting module is configured to delete a top-ranked piece of the displaying data from the displaying data pieces stored in the memory.

2. The image processing apparatus of claim 1, further comprising a controller configured
   to control the connector to close the communication path when the error is detected by the error detector,
   to control the rewriting module to delete the top-ranked displaying data piece from the memory,
   to control the connector to open the communication path after completing a deletion of the top-ranked displaying data piece, and
   to control the transmitter to transmit the displaying data pieces stored in the memory to the external device.

3. The image processing apparatus of claim 1, wherein the displaying data stored in the memory represents resolving level data indicating a resolving level in descending order.

4. The image processing apparatus of claim 1, wherein the displaying data stored in the memory represents color depth data indicating a color depth in descending order.

5. The image processing apparatus of claim 1, wherein the displaying data stored in the memory represents transmission frequencies during transmission of the stream in descending order of a transmission speed.

6. The image processing apparatus of claim 1, wherein the displaying data stored in the memory represents ranked data indicating a resolving level, a color depth, or a transmission frequency.

7. The image processing apparatus of claim 1, further comprising:
   a player configured to reproduce the stream; and
   a displaying module configured to cause a reproduction screen reproduced by the player to display a message indicating that image quality is lowered when the top-ranked piece of displaying data is deleted by the rewriting module.

8. The image processing apparatus of claim 7, wherein the displaying module is configured to cause the reproduction screen to display a message prompting to check up on a connection to the external device when the top-ranked piece of displaying data is deleted by the rewriting module.

9. The image processing apparatus of claim 1, wherein the top-ranked piece of the displaying data indicates a resolving level, a color depth, or a transmission frequency.

10. An image processing method to be used by an image processing apparatus configured to process a stream transmitted from an external device, the method comprising:
    forming a communication path with the external device;
    storing pieces of displaying data indicating formats of streams that can be processed by the image processing apparatus;
    transmitting the pieces of stored displaying data to the external device in response to a request from the external device;
    detecting an error in the stream; and
    deleting one piece of the stored displaying data when the error is detected, wherein the pieces of displaying data are configured to be ranked and the ranked displaying data pieces are configured to be stored, and a top-ranked piece of the displaying data is configured to be deleted from the displaying data pieces.

11. The image processing method of claim 10, wherein the top-ranked piece of the displaying data indicates a resolving level, a color depth, or a transmission frequency.

* * * * *